No. 671,407. Patented Apr. 2, 1901.
H. SHOEMAKER.
WIRELESS TELEGRAPHY.
(Application filed Jan. 22, 1901.)
(No Model.)
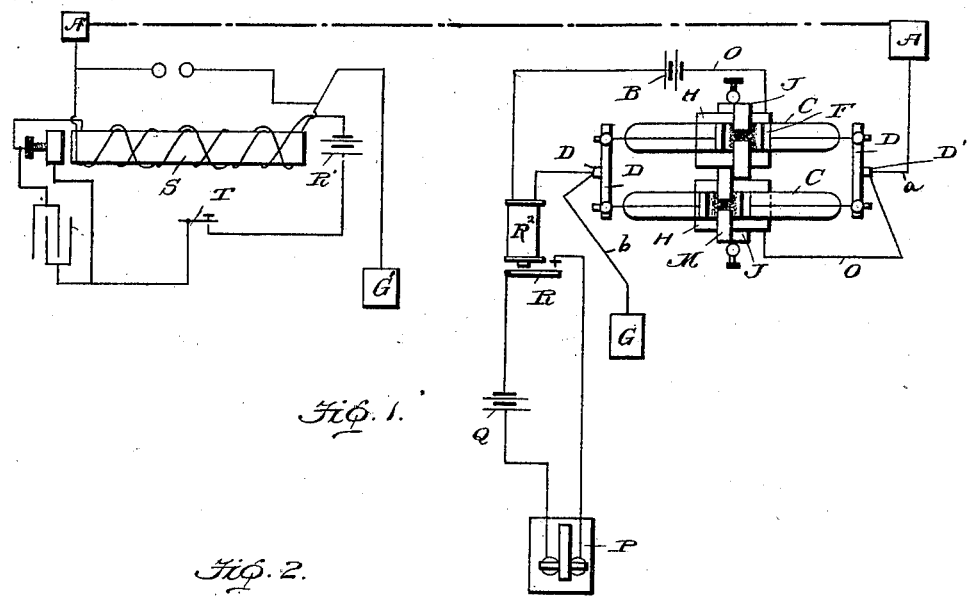
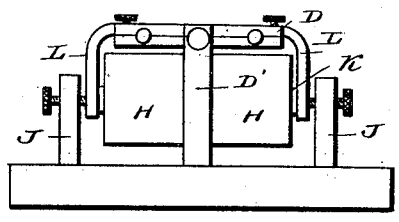
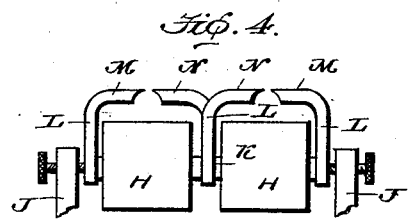
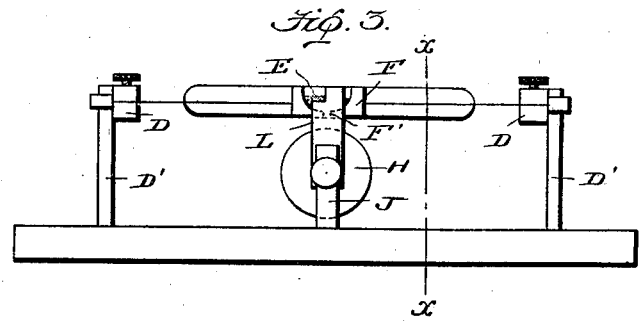
Witnesses
Inventor
Harry Shoemaker
By David P. Moore
Attorney

UNITED STATES PATENT OFFICE.

HARRY SHOEMAKER, OF PHILADELPHIA, PENNSYLVANIA, ASSIGNOR OF ONE-HALF TO MARIE V. GEHRING, OF SAME PLACE.

WIRELESS TELEGRAPHY.

SPECIFICATION forming part of Letters Patent No. 671,407, dated April 2, 1901.

Application filed January 22, 1901. Serial No. 44,270. (No model.)

*To all whom it may concern:*

Be it known that I, HARRY SHOEMAKER, a citizen of the United States, residing at Philadelphia, in the county of Philadelphia and State of Pennsylvania, have invented certain new and useful Improvements in Wireless Telegraphy, of which the following is a specification.

My invention relates to improvements in wireless telegraphy, and has special reference to an improved coherer, which is so constructed as to prevent the feathering of the powdered metal and which is therefore reliable in its action, cohering and decohering perfectly.

Another object of my invention is the provision of a coherer for wireless telegraphy so constructed and arranged that the resistance is materially lessened and the local current of electricity is varied.

To attain the desired objects, the invention consists of a coherer for the receiving-station of a wireless telegraph system embodying novel features of construction and combination of parts, substantially as disclosed herein.

In the drawings, Figure 1 is a small diagrammatical view of the transmitting and receiving stations of a wireless telegraph. Fig. 2 is a side elevation of a coherer. Fig. 3 is a front elevation thereof; and Fig. 4 is a view taken on line $x\,x$ of Fig. 3, the tubes and base not being shown.

Referring to the drawings, A designates the air-plate, and G designates the ground-plate, having connection with the batteries B and the coherer. The coherer consists of the glass tubes C, supported between the arms D on the standards D', and in these tubes are the necessary metallic powder E and silver plugs F, provided with the lower shouldered portions F'. Mounted below these tubes are the magnets H between the standards J. Connected to the core K of these magnets are the vertical plates or poles L, the end ones of which are provided with the bent ends or terminals M, which are directly opposite the V-shaped pockets of the tubes. The central pole is provided with the pair of oppositely-arranged bent ends or terminals N, making a T-shaped pole whose ends are directly opposite the pockets and the proper end of the other poles, so that a current of electricity passing through the magnets magnetizes these terminals and causes the powdered metal to be attracted therebetween.

The wires O are connected with the batteries B, the standards D', the magnet H, and also with the electromagnet $R^2$, which operates the lever R, which forms a circuit with the sounder P and batteries Q, as shown in Fig. 1, said electromagnet $R^2$ being a relay-magnet.

The transmitting-station is similar to any transmitting-station having its air and ground plates A' and G', the batteries R', the Ruhmkorff coil S, and the operating-key T all in its proper circuit.

The operation of my system is readily understood; but, briefly stated, it is as follows: The transmitting-key is operated and the impulse is transmitted through the coil S, the air-plate A', and the space to the air-plate A of the receiving-station. The impulse is then transmitted to the tubes through the wires $a$, standards D', arms D, and to the ground through wire $b$. The coherer particles lose their resistance and permit the passage of current by means of the wires O to the decohering-magnet H and its poles from the batteries B to the electromagnet $R^2$, which acts as a relay to operate the sounder-circuit.

My object in producing the decohering-magnets as described is for the reason that when a single-pole magmet is employed the lines of force take a direction so as to thread out from the poles in nearly straight lines for a short distance. The effect upon the magnetic filings in the tubes is to string them out with the line of force and cause a bridging of the plugs, thus keeping the relay closed and rendering the instrument inoperative, while with the poles arranged as shown in the drawings the lines of force cut the tubes at right angles and lift the filings clear of the plugs, thus opening the relay-circuit to make the instrument operative and to overcome the defect in the single-pole magnets.

It will thus be seen that I provide a coherer which is very simple in construction, and by the construction of the poles and the arrangement of the magnets there is absolutely no danger of the powdered metallic particles adhering to anything or becoming feathered and will cohere or decohere, as desired.

I claim—

1. In a wireless telegraph, a transmitting and a receiving apparatus, said receiving apparatus comprising non-conducting tubes, oppositely-disposed conductor-plugs arranged within the tubes and having their inner ends beveled to form a pocket, powdered particles of magnetic metal located in said pockets, a local circuit embracing said plugs and particles, and a magnet below said tubes and having the axis of its poles at right angles to the axis of the tubes and opposite the pockets thereof in said circuit arranged to act on said particles.

2. A receiving apparatus for wireless telegraphy, a coherer, comprising non-conducting tubes, alined conductor-plugs arranged within the tubes and having their separated inner ends far enough apart to form a pocket, magnetic particles located in said pocket, a local circuit embracing said plugs and magnetic particles, a relay, and a magnet in said circuit having the axis of its poles at right angles to the axis of the tubes and opposite the pockets of the tubes arranged to act on said magnetic particles.

3. A coherer for wireless telegraphy, consisting of a tube, alined conductor-plugs arranged within the tube and their separated ends far enough apart to form a pocket, magnetic particles located in said pocket, a circuit embracing said plugs and particles, and a magnet below said tube and having poles extending upward and at right angles to the axis of the tube and upon opposite sides of the tube's pockets to act upon said particles.

4. A receiving apparatus for wireless telegraphy, air and ground plates, a coherer, comprising non-conducting tubes, alined conductor-plugs arranged within the tubes and having their separated inner ends far enough apart to form a pocket, magnetic particles located in said pockets, a local circuit embracing said plugs and magnetic particles, a relay, and a magnet having upwardly-extending arms or poles at right angles to the axis of the tubes and opposite the pockets of the tubes, said magnet in said circuit.

5. A receiving apparatus for wireless telegraphy, consisting of air and ground plates, a local circuit, a coherer, a relay and a magnet in said circuit; said magnet being located below said coherer and having upwardly-extending arms or poles at right angles to the axis of the coherer upon opposite sides thereof.

In testimony whereof I affix my signature in presence of two witnesses.

HARRY SHOEMAKER.

Witnesses:
WILLIAM J. MOSS,
R. LEAMAN.